United States Patent [19]

Bergmann

[11] Patent Number: 5,703,992

[45] Date of Patent: Dec. 30, 1997

[54] METHOD AND APPARATUS FOR PACKAGING OPTICAL COMPONENTS

[75] Inventor: Ernest Eisenhardt Bergmann, Fountain Hill, Pa.

[73] Assignee: Lucent Technologies Inc., Murray Hill, N.J.

[21] Appl. No.: 578,365

[22] Filed: Dec. 26, 1995

[51] Int. Cl.$^6$ .................................................. G02B 6/00
[52] U.S. Cl. .............................. 385/139; 385/88; 359/393
[58] Field of Search .......................... 385/139, 88–94, 385/31; 359/393, 391, 398

[56] References Cited

U.S. PATENT DOCUMENTS

5,077,620  12/1991  Mauro .................................. 359/393

*Primary Examiner*—Phan T. H. Palmer

[57] ABSTRACT

An optical package and methods for its use are disclosed. The optical package may suitably include a container and a rail that fit within the container for receiving a plurality of mounted optical components. The rail may be secured within the container so that neither the rail nor the received mounted optical components move within the container. The optical package may further have at least one optical fiber termination mounted to the end of the container that is in optical communication with the optical components within the container. In methods according to the present invention, the optical package may be used for the transportation, operation, manufacturing and rapid prototyping of optical systems.

25 Claims, 5 Drawing Sheets

METHOD AND APPARATUS FOR PACKAGING OPTICAL COMPONENTS

FIELD OF THE INVENTION

The present invention relates to packaging of optical components. More particularly, the present invention relates to an apparatus for packaging and preserving the orientation of an arrangement of optical components and methods for using such an apparatus.

BACKGROUND OF THE INVENTION

In typical optical systems, a variety of optical components are arranged in a precise manner. Such components may include lenses, mirrors, filters and the like. In developing such optical systems, researchers use various means for arranging the aforementioned components. Such means includes optical tables, breadboards and rails or benches.

While nomenclature varies from manufacturer to manufacturer, an optical table generally refers to a surface, useful for mounting optical components, that is typically four feet by eight feet and is usually available in a variety of thicknesses ranging from about eight to thirty-six inches. The surface of the table includes a plurality of holes for receiving mounting devices that retain the various optical components comprising the optical system.

An optical breadboard, like the optical table, is a surface useful for mounting optical components. The optical breadboard is typically smaller and thinner than the optical table. In a typical application, an optical breadboard may be placed on an optical table or other surface and optical components arranged thereon. As required, the optical breadboard can then be moved to another location in the lab while another breadboard takes its place on the optical table for other optical development work.

An optical rail, sometimes referred to as an optical bench, is a linear bar or rail adapted for receiving mounted optical components. The optical rail can usually be either anchored to an optical table/optical bread board or used in a freestanding mode. In a typical optical rail, the upper surface of the rail receives carriers that can be locked onto the rail at any point and provide a stable mounting surface for a component mount and its associated optical component. Optical rails range in size from about four inches to over sixteen feet in length.

In the commercial implementation of an optical system, the provider of the system may assemble and distribute as few as ten or less, or as many as a million or more of such an optical system. As such, an inexpensive, portable mounting and packaging scheme is desirable for shipping and distributing the optical system. The optical mounting devices previously discussed are not well suited to such a service. Optical tables are relatively large and heavy. Once situated in a laboratory, an optical table is usually not moved. An optical arrangement disposed thereon is typically not considered to be portable. The optical rail and the optical breadboard provide a greater degree of portability than the optical table; yet, their portability is limited. While the typical optical rail or breadboard may be moved about the laboratory without concern as to the integrity of an optical system arranged thereon, such arrangements are not well suited to transportation over greater distances, such as would require postal delivery.

SUMMARY OF THE INVENTION

An optical package, and methods for its use, are disclosed. Among other uses described later in this specification, the package is useful for preserving, during shipping and deployment, the orientation and alignment of optical components that have been manufactured into an optical system. In one embodiment, the optical package comprises a container, a rail, optical components disposed on optical mounts and retaining means for preventing rotation of the rail and the optical components within the container. The rail, which is placed within the container, engages the optical mounts via a slot formed in each such optical mount. The optical mounts are preferably sized so that as successive optical mounts and their associated optical components are placed on the rail and each mount is moved into abutting relation with its neighboring mount, the optical components will be appropriately positioned for proper operation of the optical system. The retaining means prevents the optical system and rail from rotating within the container.

Preferably, at least one end of the container is attached to a single- or dual-fiber termination. The fiber termination, which can be connected to an optical source, detector, or both, is in optical communication with the optical system within the container. In this manner, an optical signal can be delivered to, and received from, the optics within the container.

BRIEF DESCRIPTION OF THE DRAWING

Further features of the invention will become apparent from the following detailed description of specific embodiments thereof when read in conjunction with the accompanying drawings, in which like elements have like reference numerals and in which.

DETAILED DESCRIPTION OF THE INVENTION

Figure 1:
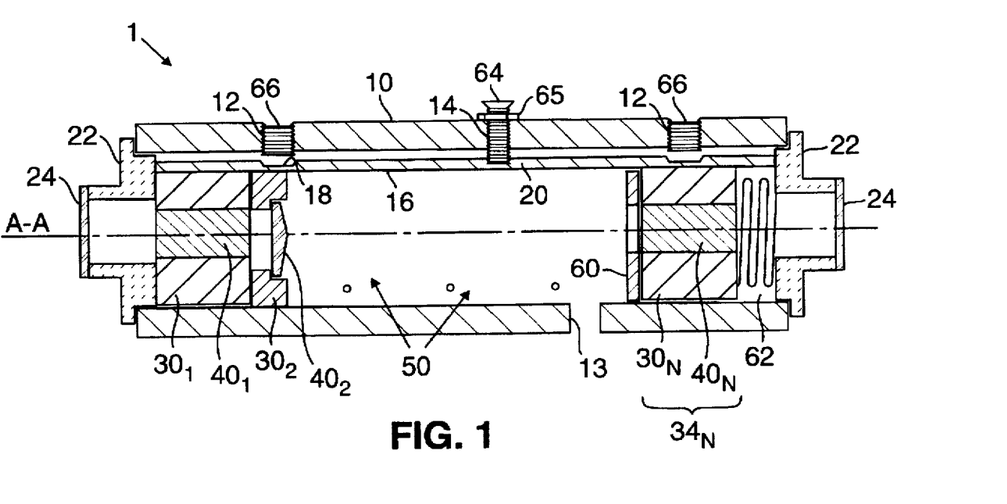
FIG. 1 is a side cross-sectional view of an embodiment of an optical package according to the present invention.
Figure 2:
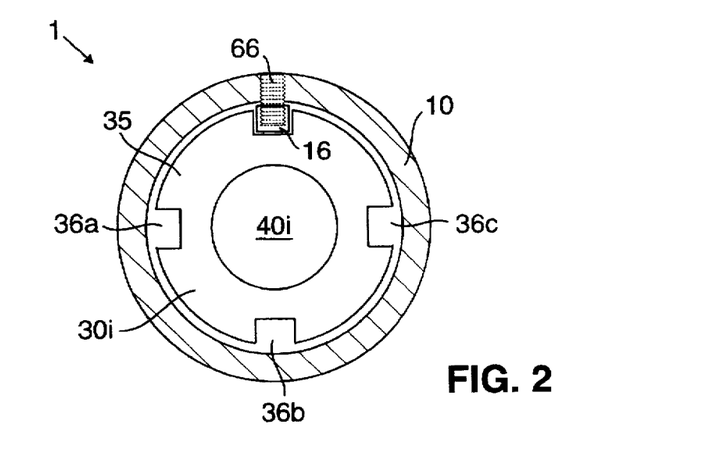
FIG. 2 is an end cross-sectional view of the optical package of FIG. 1.

An exemplary embodiment of an optical package 1 according to the present invention is shown in FIGS. 1 and 2. The optical package 1 comprises a container 10 and a linear member or rail 16. Preferably, the container 10 has a shape that is approximately rotationally symmetric, such as a cylinder. In use, the container 10 receives a plurality, N, of optical components $40_1$_N. Preferably, the plurality of optical components $40_{1-N}$ collectively comprise an optical system 50. Each optical component of the plurality $40_{1-N}$ is preferably mounted on or in one of a plurality of optical mounts $30_{1-N}$. The reference numerals $30_i$ and $40_i$ will be used in this specification to refer generally to a single optical mount and optical component, respectively, of the plurality of such mounts and components. Further, the designator "mounted optical component $34_i$," will be used to refer to a single optical component $40_i$ mounted on an optical mount $30_i$ and "mounted optical components $34_{1-N}$" refers to a plurality of such mounted components.

Each optical mount $30_i$ has at least one slot 35 that is sized to slidingly engage the rail 16. Each one of the mounted optical components $34_{1-N}$ are successively placed within the container 10 so that the slot 35 of each optical mount engages the rail 16. A capping means, such as an end cap 22, is preferably located at each end of the container 10. The end caps 22 aid in maintaining the integrity of the optical system 50 within the container 10. Each end of the container 10 can be threaded so that the end caps 22 can be screwed onto the container 10. Alternatively, the container 10 and the end caps 22 can be sized for a press fit, or a slide fit and welded. In the exemplary embodiment shown in FIG. 1, the optical package 1 further comprises a closure means, such as a plate 24. The plate 24 can be welded, or otherwise attached to the end cap 22. In an alternative embodiment, the plate can be a part of the end cap.

Preferably, the container 10 is formed from a material having a low coefficient of expansion, such as metal. In addition, the container 10 should be humidity and temperature resistant. In a preferred embodiment, the container 10 is formed from stainless steel. The optical mounts $30_{1-N}$ and optical components $40_{1-N}$ are preferably formed from materials having coefficients of expansion that are closely matched to each other. This is particularly important if the optical component is glued onto the optical mount. Preferably, all components forming the optical package should have closely matched coefficients of expansion.

In a preferred embodiment, the optical package 1 further comprises means for suitably supporting the rail 16 in position within the container 10 to receive the mounted optical components $34_{1-N}$. One means suitable for such a purpose is a screw and nut, such as the screw 64 and nut 65. The screw 64 passes through an opening 14 in the container 10 and engages the threads of a threaded region 20 in the rail 16. Once engaged in this manner, the nut 65, which abuts the outer surface of the container 10, is tightened, drawing the rail 16 toward the inner surface of the container 10. In this manner, the rail 16 is supported in position to receive the plurality of mounted optical components $34_{1-N}$. After the mounted optical components $34_{1-N}$ are placed within the container, engaging the rail 16 as previously described, the screw 64 and nut 65 are no longer needed and can be removed.

Preferably, the container 10 is sized to be somewhat larger than required to retain the plurality of mounted optical components $34_{1-N}$. As such, in a preferred embodiment, an optical package according to the present invention further comprises means suitable for pressing the mounted optical components $34_{1-N}$ together to prevent them from sliding on the rail 16 during transport. One means suitable for such a purpose is a spring 62. The spring 62 is preferably placed in the container 10 after the final mounted optical component $34_N$. The spring 62 is suitably selected so that as the appropriate end cap 22 is placed on the end of the container 10, the spring 62 is compressed. This compressive force will likewise force the mounted optical components $34_{1-N}$ together, preventing or minimizing movement of such components within the container 10. If there is no intention to disassemble the optical system 50, epoxy may be injected between at least the final component mount $30_N$ and the container 10 as an alternative to, or in conjunction with, using the spring 62 to prevent movement.

The present invention has a variety of applications. In one embodiment, the optical package can be used simply as a means for transporting optics or an optical system, hereinafter referred to as a transport-only optical package. Once such a transport-only optical package has arrived at its destination, the rail 16 and mounted optical components $34_{1-N}$ may be removed from the container 10. In a preferred embodiment, the optical package can be employed as a means for using, as well as transporting, an optical system. In such an embodiment, mounted optical components $34_{1-N}$ remain in the container 10 during testing or use of the optical system 50. In a third embodiment, discussed in more detail later in this specification, the optical package can be used for prototyping and testing. These latter two embodiments, wherein an optical signal is delivered to the optics within the container 10, are hereinafter referred to as in situ operation.

The physical configuration of an optical package may be different for the different embodiments described above. For example, the optical package must be physically adapted to introduce an optical signal into the optical system for in situ operation. Further, it will be appreciated that for in situ operation, proper alignment of the optical components $40_{1-N}$ within the optical package must be maintained. Certain structural adaptations are thus preferably incorporated in an optical package for in situ operation relative to a transport-only package. Such adaptations are described below. It will be appreciated that while it may be desirable to incorporate such features in transport-only embodiments of an optical package, they are not required.

Since a typical optical system will be characterized by a particular configuration of optical components $40_{1-N}$, such optical components must be placed in the container 10 in the appropriate order. The spacing or distance of each optical component $40_{1-N}$ from its neighboring component is often important, as well. Proper spacing between the optical components can be achieved by appropriately sizing each optical mount $30_{1-N}$. Further, one or more spacers, such as the spacer 60, can be used to achieve a required separation between the optical components $40_{1-N}$.

The behavior of various optical components $40_{1-N}$ may vary as such components are rotated axially within the container 10. The rail 16 prevents an optical component, such as the optical component $40_1$, from rotating about the axis A—A with respect to any other optical component $40_{2-N}$. In a preferred embodiment, the optical package 1 comprises means for preventing the rail 16 and the engaged mounted optical components $34_{1-N}$ from collectively rotating within the container 10. One suitable means for preventing such rotation is a set screw, such as the set screw 66, which engages the threads of the threaded opening 12 within the wall of container 10. Optionally, the rail 16 includes a recess 18 for receiving the set screw 66. Preferably, the recess 18 is a "v-groove" parallel to axis A—A. With the set screw 66 positioned within the recess 18, the rail 16 and the engaged mounted optical components $34_{1-N}$ are prevented from collectively rotating within the container 10.

Additionally, the pressure of the set screw 66 against the rail 16 presses the rail into binding contact with the slot 35 in each optical mount $30_{1-N}$. As a result of such pressure, the sliding engagement of the optical mounts $30_{1-N}$ is changed to a tight, non-sliding engagement. Preferably, as shown in FIG. 1, two or more such set screws 66 and a corresponding number of recesses 18 in the rail 16 are used for this purpose. Other suitable methods and mechanisms for preventing such rotation will be apparent to those skilled in the art. Thus, the set screw 66 and the spring 62, previously discussed, ensure that the mounted optical components $34_{1-N}$ are rigidly fixed in position within the container 10.

Figure 3:
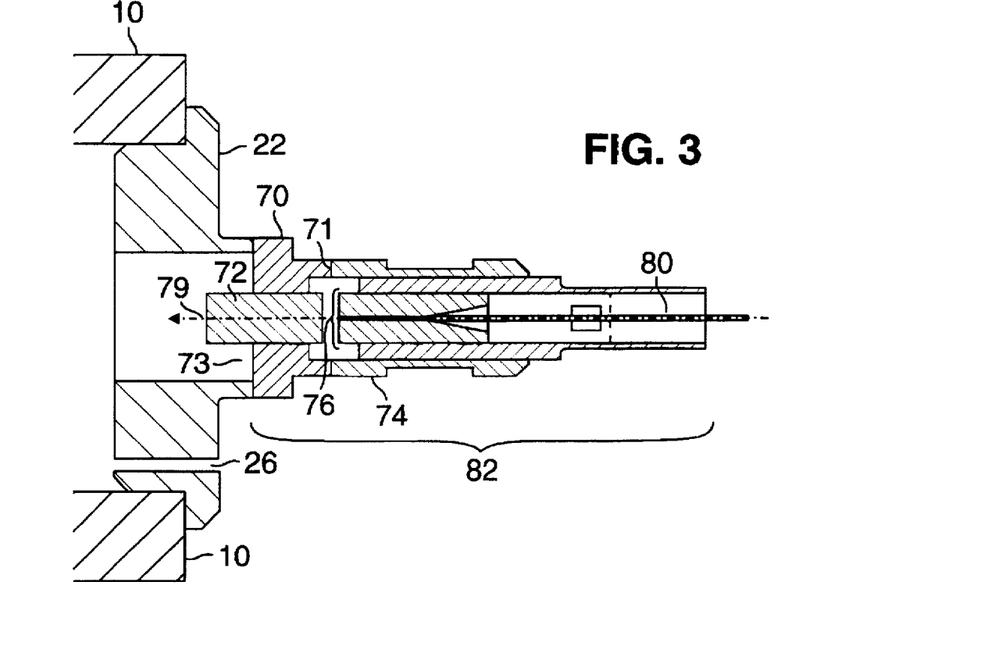
FIG. 3 is a side cross-sectional view of a further embodiment of an optical package wherein one end cap is attached to an exemplary single-fiber termination.
Figure 4A:
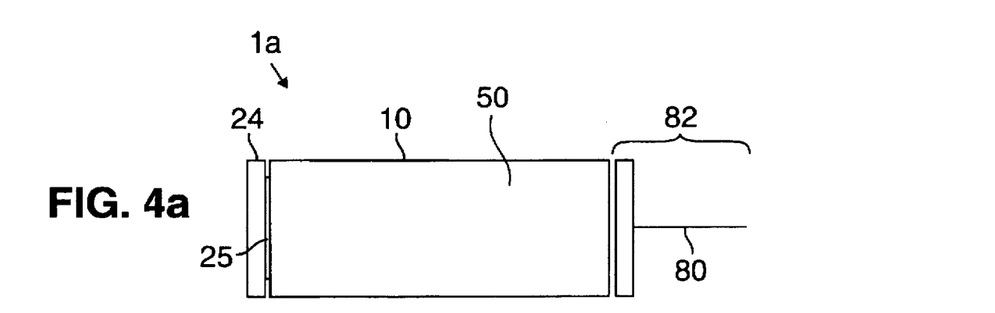
FIG. 4a is a schematic representation of the optical package of FIG. 3.

As previously noted, an optical signal must be introduced into the optical system 50 for in situ operation of an optical package according to the present invention. In a preferred embodiment of an optical package 1a according to the present invention, shown schematically in FIG. 4a, at least one of the plates 24a his replaced by a fiber termination assembly, such as exemplary fiber termination assembly 82 shown in FIG. 3. The fiber termination assembly 82 comprises a collimating lens holder 70, a collimating lens 72, a z-sleeve 74, a fiber termination 76 and a fiber 80. The optical fiber 80 is terminated in the fiber termination 76. The fiber termination is received by, and welded to, the z-sleeve 74. The z-sleeve is welded to the surface of a circumferential ridge 71 of collimating lens holder 70. The outer portion of the surface 73 of the collimating lens holder 70 is welded to the end cap 22. The collimating lens holder 70 receives the collimating lens 72, which lens is in optical communication with an optical signal 79 from the fiber termination 76, and is also in optical communication with the optical system 50 within the container 10. The collimating lens 72 collimates the optical signal emerging from the fiber termination 76. The collimating lens 72 can be, without limitation, a graded index (GRIN) lens. Before welding any of the aforementioned elements, they must be properly aligned, which is within the capabilities of those skilled in the art. It should be appreciated that other acceptable arrangements for delivering an optical signal to the optical system 50 within the container 10 that occur to those skilled in the art can be used in conjunction with the present invention.

A fiber termination assembly, such as the fiber termination assembly 82, can be located at one or both ends of the container 10. For example, in the optical package 1a, shown schematically in FIG. 4a, a fiber termination assembly 82 is located at a first end of the container 10 and a plate 24a is located at the second end of the container 10. A target device 25 such as, without limitation, a photo detector, absorber or mirror may be disposed on the surface of the plate facing the inside of the container 10. If the target device 25 is a mirror, an optical signal can enter and exit the optical system 50 within the container 10 via the fiber termination assembly 82. The optical fiber 80 can be connected to other optical systems, such as detection devices, for further processing of the optical signal or for evaluation of the optical system 50 within the container 10. If the target device 25 is an absorber or photo-detector, for example, then the target device 25 itself may be connected to processing electronics. In a further embodiment, the target device 25 can be located in an optical mount rather than on the surface of the plate 24a.

Figure 4B:
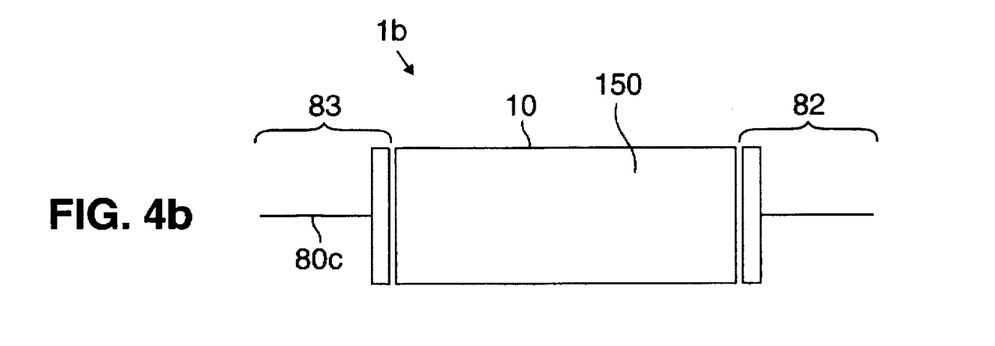
FIG. 4b is a schematic representation of a third embodiment of an optical package.

In a further embodiment of the present invention illustrated in FIG. 4b, an optical package 1b comprises the first fiber termination assembly 82 located at a first end of a container 10 and a second fiber termination assembly 83 located at a second end of the container. In the optical package 1b, an optical signal may enter the container 10 through one of the fiber termination assemblies 82 or 83, and leave through the other fiber termination assembly, 83 or 82, depending upon the arrangement of the optical system 150 within the container 10.

Figure 5A:
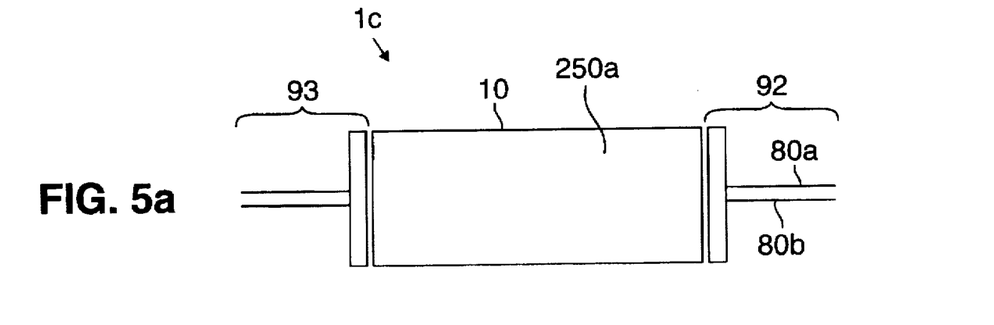
FIGS. 5a–5c are schematic representations of three further embodiments of an optical package according to the present invention, wherein at least one end cap is attached to a dual-fiber termination.

Optical packages 1a and 1b were implemented using a single-fiber termination. In other optical packages according to the present invention, the single-fiber termination can be replaced by a dual-fiber termination. For example, in a further embodiment of an optical package 1c, which is illustrated schematically in FIG. 5a, dual-fiber terminations, such as dual-fiber terminations 92 and 93, can be located at both ends of a container 10. In another embodiment of an optical package 1d shown in FIG. 5b, a dual-fiber termination, such as dual-fiber termination 92, can be used in conjunction with a single-fiber termination, such as the single-fiber termination 83. In an additional embodiment illustrated in FIG. 5c, an optical package 1e includes a dual-fiber termination 92 used in conjunction with a plate 124a and a target device 125. FIGS. 6a–6c illustrate the use of a pair of mirrors 125a, a porro prism 125b and a lens 49 and mirror 125c combination in conjunction with a dual-fiber termination according to the embodiment 1e of an optical package shown in FIG. 5c. In the embodiments shown in FIGS. 6a–6c, an optical signal is introduced into the optical system via one of the optical fibers 80a or 80b of the dual-fiber termination 92, is redirected via the target device 125a–125c, and exits the optical system via the other optical fiber of the dual-fiber termination 92. The target 125 can be attached to the inner surface of plate 124a, or can be mounted in a component mount. Preferably, the optical axis of each of the various optical systems described in this specification is approximately coincident with the rotational axis A—A of the container 10.

Figure 7A:
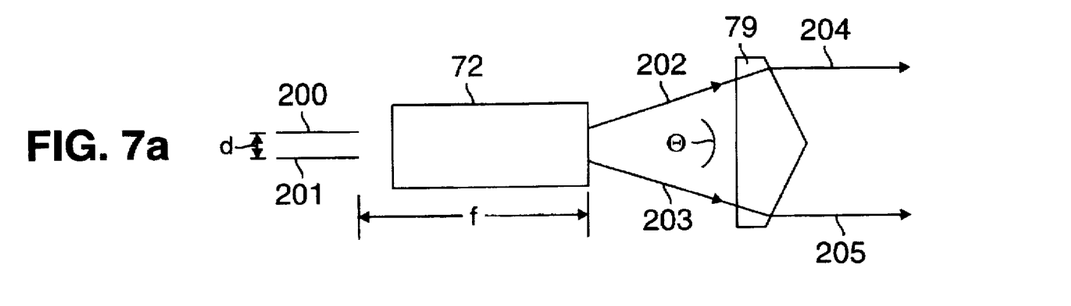
FIG. 7a shows a first means for converting two angled beams into two parallel beams.
Figure 7B:
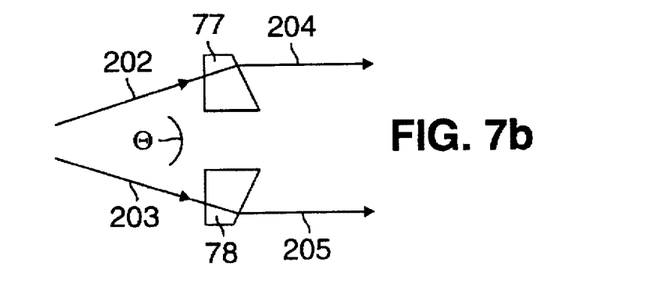
FIG. 7b shows a second means for converting two angled beams into two parallel beams.

For applications utilizing two optical signals, i.e., a dual-fiber termination, the optics within the container 10 may require parallel beams. As illustrated in FIG. 7a, as the optical beams 202 and 203 emerge from the collimating lens 72, the beams will not be parallel. The angle, Θ, between the two collimated beams 202, 203, is given by the formula: $\tan(\Theta/2)=(d/2)/f$, where d is the distance between the two terminated optical fibers 200, 201 and f is the focal length of the collimating lens 72. The above relation can be approximated by the following formula: $\Theta \approx d/f$. Thus, a means for convening the beams 202, 203 to parallel beams 204, 205 is required. A "biprism" 79 can be used for this purpose. Alternatively, two wedges 77, 78 may be placed together for the same effect as shown in FIG. 7b. Other means suitable for accomplishing this function known to those skilled in the an may be used in conjunction with the present invention. The preferred positioning of the biprism 79 or wedges 77, 78 relative to the collimating lens 72 will be discussed later in this specification in conjunction with a description of a specific optical package 50c shown in FIG. 9.

For in situ operation, the optics within the container 10 must be aligned. Methods for aligning the mounted optical components $34_{1-N}$ in the container 10, such as auto collimation, are well known to those skilled in the art.

It will be appreciated that not all of the elements of the various embodiments of the optical package described above and illustrated in FIGS. 4a, 4b, 5a–5c and 6a–6c are suitable for all optical systems or applications. It is, however, within the capabilities of those skilled in the an to select a suitable combination of the disclosed elements to form an optical package appropriate for a particular application.

As previously noted, optical systems for use in the present invention may include electrically-connected components such as, for example, the electromagnet for a Faraday rotator, a heater for temperature control or a photodetector for monitoring light levels, among other such components. For in situ operation, such an electrically-powered component must be in electrical contact with a current or voltage source that is typically located outside of the optical package. For such an application, the optical package preferably includes at least one port, such as port 13 shown in FIG. 1, through which electrical connections, i.e., wires, can pass. Alternatively, the end caps 22 can be provided with a port, such as port 26 shown in FIG. 3.

As previously noted, the optical package of the present invention can be used for prototyping and testing. In such an application, a first portion of mounted optical components comprising some but not all of the optical components $40_{1-N}$ of an optical system 50 may be placed with the container 10 and tested as to their optical or mechanical performance. Once the first portion is tested and found to be acceptable, a second portion of the optical system 50 can be inserted into the container 10 for testing, and so forth until the complete optical system 50 has been tested. The sliding engagement of the mounted optical components $34_{1-N}$ with the rail facilitates rapid removal or exchange of components from and to the container 10. The sliding engagement of the component mounts $30_{1-N}$ with the rail 16 finds particular utility in conjunction with mounted alignment and testing components that are used in the present invention. Such components may be repeatedly inserted and removed from the system as they are used to align and evaluate portions of an optical system. Such alignment and testing components include, without limitation, photo detectors, mirrors and pin holes or other apertures.

In a preferred embodiment, at least two additional slots are placed in each optical mount $30_i$ of the plurality. FIG. 2 shows three such additional slots 36a–36c. Such slots allow the optical mounts to be readily grasped by forceps to facilitate the removal of the mounted optical components $34_{1-N}$ from the container 10. The additional slots 36 also allow a mounted optical component $34_i$ to be inserted into the container 10 in additional orientations by engaging a different slot with the rail. For example, the three additional slots 36a–36c and the slot 35 that are located equidistantly from one another along the perimeter of the optical mount $30_2$ shown in FIG. 2 allow the associated optical component $40_i$ to be rotated through 360 degrees in 90 degree increments. In this manner, a single mounted optical component $34_i$ can be used for several different applications within a given design, or different optical designs can be implemented with a common set of mounted optical components $34_{1-N}$. The additional slots 36 are further useful for routing electrical wires within the container 10.

It should be appreciated that while the slots 35 and 36 are shown as having a rectangular shape in FIG. 2, they may have other suitable shapes in other embodiments. In such other embodiments, the rail 16 preferably has a complementary shape for engaging the slots. For example, if the slots are v-grooves, the sides of the rail should be tapered to be received by the v-grooves.

Figure 8:
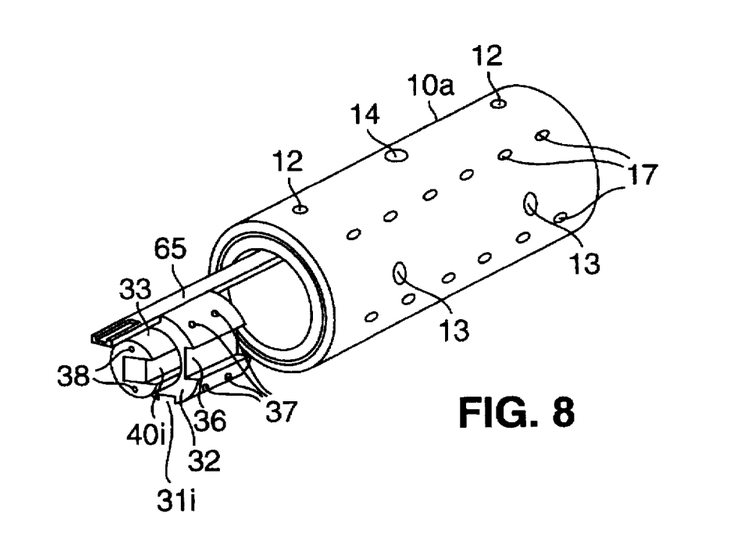
FIG. 8 is a perspective, exploded view of a further embodiment of an optical package.

In a further preferred embodiment, illustrated in FIG. 8, the optical package includes a container 10a having a plurality of holes 17 for use in conjunction with an optical mount $31_i$. The optical mount $31_i$ is comprised of an outer mount 32 and an inner mount 33. The inner diameter of the outermost 32 and the outer diameter of the inner mount 33 are sized to allow the inner mount 33 to rotate within the outer mount 32. The inner mount 33 receives the optical component, such as optical component $40_i$, and the outer mount 32 engages the rail 16 via slots 35 or 36. Thus, the optical component $40_i$ can be rotated even while the optical mount $31_i$ is engaged to the rail 16. Such an arrangement simplifies prototyping, testing and alignment activities.

The inner mount 33 is preferably provided with holes 38 or other engagable features to facilitate rotating the inner mount while the optical mount $31_i$ is engaged to the rail 16 within the container 10a. A tool having a complementary number of prongs appropriately spaced for mating with the holes 38, or other means for engaging other engagable features, can be used to rotate the inner mount 33. Set screws, not shown, located within threaded holes 37 may be tightened down to prevent the inner mount 33 from rotating within the outer mount 32. Holes 17 in container 10a are used to access the set screws while the optical mount $31_i$ is engaged to the rail 16 within the container. Additional holes 13 can be used for incorporating the optical package in a larger optical system. It will be appreciated that either more or less holes 13, 17, 37 and 38 may be used than are shown in FIG. 8.

It will be appreciated by those skilled in the art that component mounts other than those described herein may be used in conjunction with the present invention. For example, a component mount adapted to receive more than one optical component $40_i$ may be utilized.

Figure 9:
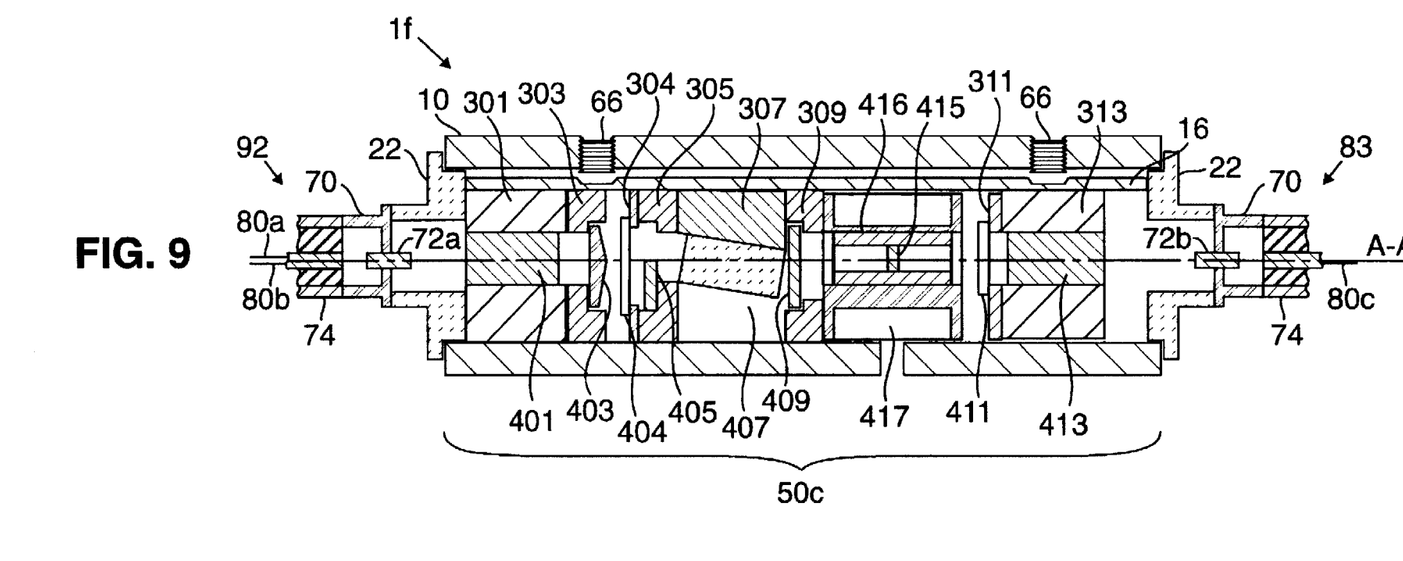
FIG. 9 is an illustration of an optical package according to the present invention incorporating a specific arrangement of optical components arranged as an optical system 50c.

FIG. 9 is an illustration of an optical package 1f according to the present invention comprising a specific arrangement of optical and electrical components defining an optical system 50c. Neither the function of the optical system 50c nor the function of the various optical and electrical components 401–417 comprising the system will be discussed since such information is not necessary for a complete description of the present invention. The optical system 50c and its constituents will, however, be used to illustrate various preferred aspects of incorporating exemplary components into an optical package according to the present invention.

Figure 5B:
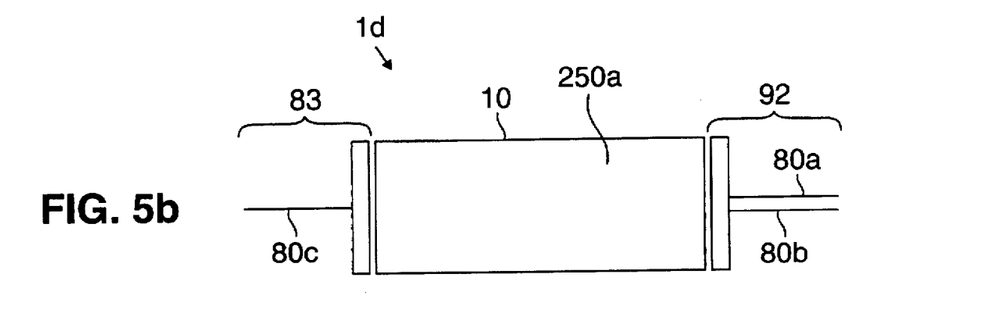
Figure 5C:
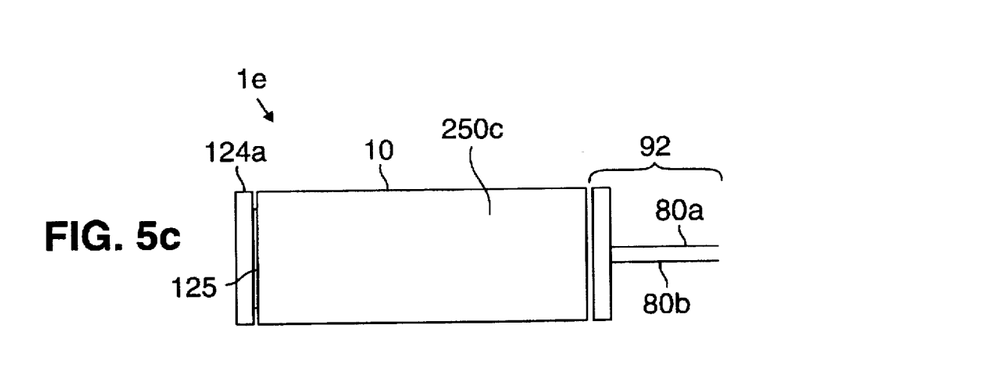
Figure 6A:
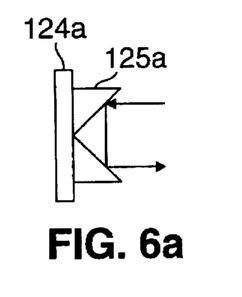
FIGS. 6a–6c illustrate three embodiments of the optical package shown in FIG. 5c.
Figure 6B:
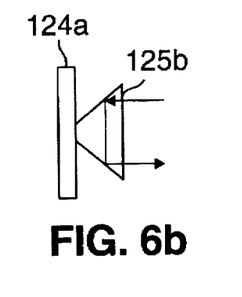
Figure 6C:
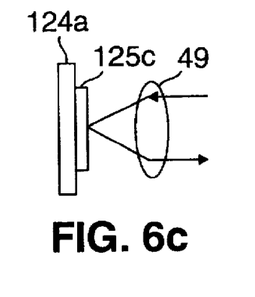

As shown in FIG. 9, the optical package 1f, like the optical package 1d of FIG. 5b includes one single-fiber termination assembly 83 and one dual-fiber termination assembly 92. The optical package 1f further includes, in sequence, a walk-off plate 401, biprism 403, λ/2 plate 404, λ/2 plate 405, walk-off plate 407, λ/2, plate 409, Faraday rotator 415 with magnetizable material 416 and coil 417, λ/2 plate 411 and walk-off plate 413. Each optical component 401–413 listed above is associated with a component mount, correspondingly numbered 301–313. In the optical system 50c, two optical signals are introduced into the optical package 1f from the optical fibers 80a and 80b.

As already discussed, some optical systems, such as the optical system 50c, may be designed to process two parallel optical signals. If a dual-fiber termination assembly, such as the assembly 92, is used to introduce two such optical beams into the optical package 50c, a means such as the biprism 403 will be required to convert the two beams emerging from the collimating lens 72a to parallel beams, as previously described. In the optical package 50c, it is preferable that the walk-off plate 401 is placed between the collimating lens 72a and the biprism 403. The reason for this is that if the biprism 403 is located next to the collimating lens 72a, then there would need to be a region of dead or unused space in which the optical beams are allowed to diverge toward the right sufficiently for proper functioning of the biprism 403. By placing the biprism 403 to the right of the walk-off plate 401, such dead space is avoided, since the beams will diverge toward the right through the walk-off plate 401. The optical system 50c is therefore shortened, with the consequence that the optical system 50c can be placed within a shorter container 10. It should be appreciated that in other optical systems, other components may suitably be placed between a collimating lens and biprism, depending upon the particulars of such other optical systems.

In the arrangement described above, the potential exists for polarization dependent signal loss (PDL) because the birefringence of the walk-off plate causes the point of intersection of the collimated beams to be slightly different for the O- and E-polarizations. Such signal loss; however, has been observed to be minimal.

Figure 10A:
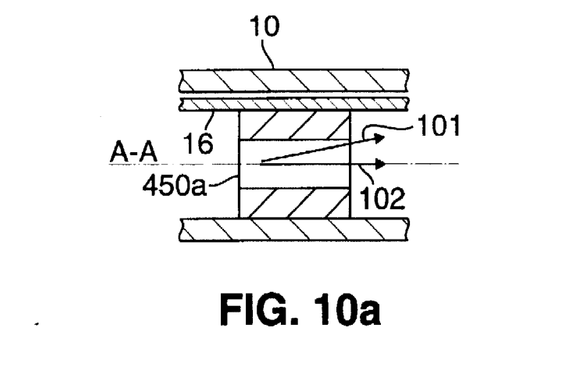
FIGS. 10a and 10b illustrate a preferred orientation for one of the components of the optical package shown in FIG. 9.
Figure 10B:
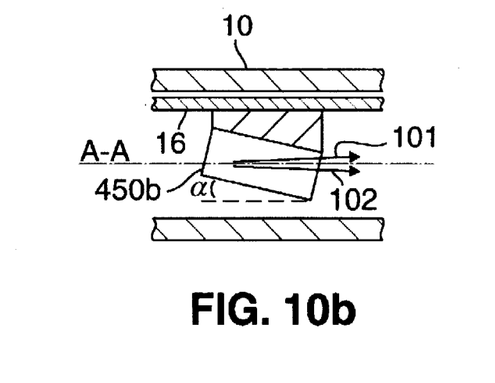

In a further preferred embodiment of the present invention, walk-off plates that are included in optical packages according to the present invention are tilted so that the O- and E-polarized optical signals emerging from such walk-off plates are symmetrically displaced from the rotational axis A—A of the container 10, as shown in FIGS. 10a and 10b. Compare the O- and E-polarizations, designated 101 and 102, of an optical signal exiting a walk-off plate 450a that is not tilted, as shown in FIG. 10a, to the O- and E- polarizations of an optical signal exiting a tilted walk-off plate 450b, as shown in FIG. 10b. For the case of a rutile walk-off plate, for infrared wavelengths from about 1.5 to 1.6 nanometers (nm), the tilt angle of the walk-off plate, α, is preferably about 4.28 degrees. For a rutile walk-off plate so tillted, the O- and E- optical signals each travel at an angle of about 2.76 degrees to the axis while within the walk-off plate, emerging from the walk-off plate parallel and approximately equally displaced about the axis. Furthermore, the tilting of the walk-off plates and other optical components such as the fiber terminations and the faces of the GRIN lenses reduces the potential that reflections from surfaces will inadvertently be received at various device ports, i.e., fibers.

Although the aforementioned "tilt" is apparent only in walk-off plate 407, all three walk-off plates shown in FIG. 9, e.g., plates 401,407 and 413 are tilted as described above. Walk-off plates 401 and 413 do not appear tilted in the cross-section shown in FIG. 9 as they have a different orientation than plate 407. If the components were rotated 90 degrees within the container 10, walk-off plates 401 and 413 would appear tilted and walk-off plate 407 would not.

Depending upon their function in a given optical system, certain components must be aligned relative to the optical axis so that they can discriminate between optical beams. In the optical system 50c of FIG. 9, such components include the biprism 403, λ/2 plate 404, λ/2 plate 405, and λ/2 plate 411. Other components, such as the λ/2 plate 409 and the Faraday rotator 415 of the optical system 50c, do not need to partition their behavior with respect to the optical axis. Such components should "straddle" the axis A—A and have a large enough clear aperture so that the optical beams are not "clipped" by the edges of the aperture.

The foregoing embodiments of the present invention are illustrative of the principles of this invention and are not intended to limit the invention in any way. It will be further appreciated that various modifications may occur to those skilled in the art in view of the present teachings without departing from the scope and spirit of the invention.

I claim:

1. An optical package comprising:

a container for receiving at least one mounted optical component; and a linear member that fits within the container for slidingly engaging the mounted optical component, wherein, after the linear member and the mounted optical component are so engaged, the linear member is secured in place within the container so that neither the linear member nor the received mounted optical component move within the container.

2. The optical package of claim 1 further comprising at least one mounted optical component, the mounted optical component further comprising an optical mount and an optical component, wherein the optical mount is physically adapted to be received by the linear member.

3. The optical package of claim 2 wherein the optical mount of at least one mounted optical component has at least three slots along its periphery.

4. The optical package of claim 2 further comprising a set screw for preventing the linear member and the received mounted optical components from collectively rotating within the container.

5. The optical package of claim 1 wherein the container is rotationally symmetric.

6. The optical package of claim 1 further comprising at least one fiber termination assembly for introducing an optical signal into, or receiving an optical signal from, the container.

7. An optical package that contains at least a first part of an optical system, the optical package comprising:

a container having a first and a second end;

a rail that fits within the container;

a plurality of optical components mounted on a plurality of optical mounts, the optical components collectively defining the first part of the optical system, wherein each mount is physically adapted to fit within the container and slidingly engage the rail, and wherein, when engaged, the optical mounts and the rail are in a first position within the container;

at least a first optical fiber terminating near the first end of the container, which optical fiber is in optical communication with the optical system within the container along an optical axis; and a device that prevents the rail and the engaged optical mounts from rotating from the first position within the container.

8. The optical package of claim 7 wherein the container is approximately rotationally symmetric about a rotational axis.

9. The optical package of claim 8 wherein the optical axis is approximately coincident with the rotational axis.

10. The optical package of claim 7 further comprising a second optical fiber terminating near the first end of the container and a device that converts two optical beams delivered to the optical system within the container by the first and second optical fibers into two parallel optical beams.

11. The optical package of claim 7 further comprising at least a second optical fiber terminating near the second end of the container and in optical communication with the optical system within the container.

12. The optical package of claim 7 wherein each optical mount has at least one slot located near the perimeter of the optical mount by which the optical mount slidingly engages the rail.

13. The optical package of claim 7 wherein the optical fiber is in optical communication with optical processing equipment located outside of the container.

14. A method for packaging optical systems utilizing mounted optical components, each of which mounted optical components includes an optical mount with at least one optical component disposed thereon, comprising the steps of:

(a) providing a container having an open end, and a rail that fits within the container for receiving the mounted optical components;

(b) engaging one or more mounted optical components with the rail in a first position by positioning the one or more mounted components so that a first slot of a plurality of slots located in the optical mount is received by the rail as the one or more mounted components are placed within the container; and (c) closing the open end of the container.

15. A method for prototyping, testing, manufacturing or packaging an optical system at a first location utilizing mounted optical components, each of which mounted optical components includes an optical mount with at least one optical component disposed thereon, comprising the steps of:

(a) providing a container having a body portion, and a rail that fits within the body portion of the container for receiving the mounted optical components;

(b) engaging one or more mounted optical components with the rail in a first position by positioning the one or more mounted components so that a first slot of a plurality of slots located in the optical mount is received by the rail as the one or more mounted components are placed within the container; and (c) checking the performance of the one or more engaged optical components.

16. The method of claim 15 wherein step (c) further comprises introducing an optical signal into the container, which optical signal is in optical communication with the engaged mounted optical components.

17. The method of claim 16 wherein:

step (a) further comprises providing a container having a plurality of holes in the body portion, which holes allow access to the interior of the container;

at least one of the mounted optical components that is engaged to the rail in step (b) is physically adapted to allow the optical component to rotate independently of optical mount, and wherein step (b) further comprises placing the optical component in a first rotational position before engaging the mounted optical component with the rail; and step (c) further comprises rotating the optical component from the first rotational position to a second rotational position.

18. The method of claim 17 further comprising the step:

(d) removing one or more mounted optical components from the container.

19. The method of claim 18 further comprising the steps:

(e) providing a second container and a rail that fits within the second container for receiving the mounted optical components removed in step (d); and (f) engaging the mounted optical components removed in step (d) with the rail as the mounted optical components are placed within the container.

20. The method of claim 19 further comprising the step of sending the container to a second location.

21. The method of claim 19 wherein step (c) further comprises rotating the optical component while the optical mount is engaged to the rail.

22. The method of claim 16 wherein step (c) further comprises engaging at least one mounted testing component with the rail within the container and removing the at least one mounted testing component from the rail and the container when performance checking is complete.

23. The method of claim 22 wherein the step of engaging at least one mounted testing component with the rail comprises engaging at least one mounted testing component selected from the group consisting of a photo detector, a mirror and an aperture.

24. The method of claim 16 wherein step (c) further comprises routing the optical signal, after it optically communicates with the mounted optical components, to a device or system for evaluating the performance of the mounted optical components.

25. The method of claim 15 further comprising the steps of:

(e) removing at least one of the mounted optical components from the container; and (f) re-engaging the removed mounted optical component with the rail in a second position by positioning said mounted component so that a second slot of the plurality of slots located in the optical mount is received by the rail as the mounted component is placed within the container, wherein, said second position results in different performance or function for the mounted optical component than the first position.

* * * * *